United States Patent Office 2,955,056
Patented Oct. 4, 1960

2,955,056

POLYURETHANE FOAMS COATED WITH A POLYURETHANE ELASTOMER

Roger E. Knox, Brandywine Hundred, Del., assignor to E. I. du Pont de Nemours and Company, Wilmington, Del., a corporation of Delaware No Drawing. Filed Feb. 27, 1959, Ser. No. 795,924

5 Claims. (Cl. 117—98)

This invention relates to a novel resilient polyurethane foam and more particularly to a resilient, cellular polyurethane composite structure wherein the cell walls have adhered thereto a polyurethane elastomer.

Resilient polyurethane foams are being used more and more today. They display higher load-bearing capacity, better abrasion resistance, and less flammability than conventional latex rubber foam. In order that resilient polyurethane foams be as economically competitive as possible, it is desirable to minimize their cost per unit of volume; thus there is a trend today toward lower foam density. Foam formulations and processing techniques are available for the routine manufacture of foams of extremely low density. Unfortunately, the physical properties (particularly the tensile strength, tear strength, and compression/deflection behavior) displayed by these lighter foams are unacceptable for some commercial applications; in consequence, higher density foams must be used which are too expensive to be economically attractive. Today a compromise has to be made between foam volume cost and physical properties. It would be highly desirable to provide a resilient polyurethane foam of relatively low density which foam has many of the desirable physical properties of higher density foams.

It is an object of the present invention to provide a novel resilient polyurethane foam. A further object is to provide a resilient polyurethane foam wherein the cell walls have a polyurethane elastomer adhered thereto. A still further object is to provide a resilient polyurethane foam having improved physical properties. An additional object is to provide a process for the preparation of such polyurethane foams. Other objects will appear hereinafter.

These and other objects of the invention are accomplished by a resilient, cellular polyurethane composite structure which is obtained by the process comprising (a) forming a resilient, substantially open-celled polyurethane foam having a density not greater than about 3 pounds per cubic foot, (b) coating the cell walls of said polyurethane foam with a fluid composition, said composition comprising an isocyanate-terminated polyurethane polymer and a compound having a plurality of groups which are capable of reacting with isocyanate groups, said compound being selected from the group consisting of organic polyols, organic diamines and mixtures thereof, and (c) curing said fluid composition to form a polyurethane elastomer which adheres to said cell walls so as to provide a resilient, cellular polyurethane composite structure wherein the cell walls are coated with a poyurethane elastomer.

The novel composite structure of the present invention, which may be defined broadly as being a resilient polyurethane foam coated throughout with a polyurethane elastomer, has improved physical properties as compared with a resilient polyurethane foam wherein the cell walls are not coated. Thus, the properties, such as tensile strength, tear strength and compression/deflection behavior, are markedly improved. Also, even though the coating of the cell walls with a polyurethane elastomer increases the over-all foam density, it has been determined that the physical properties of the composite structure are superior to an uncoated polyurethane foam of equivalent density.

The cellular polyurethane composite structures of the present invention are prepared by a 3-step procedure. In the first step a resilient, substantially open-celled polyurethane foam having a density of not greater than about 3 lbs./cu. ft. is made by conventional means. In the second step this foam is contacted with a fluid, curable composition so as to coat the cell walls of the foam. In the third step this fluid composition is cured so as to provide a polyurethane elastomer which is adhered to the cell walls. The entire, low density, resilient polyurethane foam serves as a support on which a new, stronger structure, i.e., the polyurethane elastomer, is built. After the cell walls have been coated and the fluid composition cured to an elastomer, some of the cells may no longer be interconnecting. In any event, a cellular composite structure is obtained.

In general, any resilient, substantially open-celled polyurethane foam may be used in preparing the novel composite structures of the present invention. The term "resilient" means a foam which exhibits a Yerzley resilience of at least 25% and an extension at break of at least 100%, both values being obtained by measurements at 25° C. The term "open-celled" means that at least 90% of the cells in the foam are interconnecting. It is to be understood that resilient polyurethane foams when prepared may have a residual closed cell content (e.g. 10%). However, these closed cells are usually crushed open afterward by milling the foam. It is preferred to use polyurethane foams having a density of not greater than about 3 lbs./cu. ft. Foams of greater density may be used, but in general the properties of these foams do not need to be improved as greatly as those of the less dense foams. Also, the more dense the foam, the closer its properties approach those of a solid elastomer and, therefore, there is a less significant effect obtained by coating the cellular network with an elastomer.

The size of the cells in the resilient polyurethane foam which is used in the present invention will have a bearing on the ease with which these cells may be coated with the fluid curable composition. Foams having small cells will be more difficult to coat than coarse-celled foams; however, the greater surface area of the former will permit incorporation of more elastomer. In general, it is preferred that the average cell size range from about 1 to 2.5 mm. in diameter. The cellular network should be interconnecting. That is, there should be as few closed cells as possible in the foam in order that the curable fluid coating composition be able to penetrate the foam easily and become uniformly distributed. Some freshly-prepared resilient polyurethane foams contain a small closed cell content; these cells can be crushed open by passing the foam through squeeze rolls.

The dimensions of the polyurethane foam are not critical. It is to be understood that the deeper a foam is, the longer it will take for the curable fluid coating composition to reach the center. Generally, foams having a depth less than 18 inches may be readily employed in making the subject articles. Thicker foams can be treated by using a fluid, polyurethane coating composition which cures slowly enough so that its viscosity remains conveniently low until the foam has been impregnated or by diffusing the fluid composition through the porous network by applying external pressure.

The resilient, substantially open-celled polyurethane foams are prepared by the reaction of water with a foamable composition which will yield a resilient cellular material. This foamable composition can be: (A) an isocyanate-terminated polyurethane, or (B) a mixture of such a polyurethane with a polyol, or (C) a mixture of an aromatic polyisocyanate with a polyol, or (D) a mixture of a polyol with one or more aromatic polyisocyanates and one or more isocyanate-terminated polyurethanes.

The isocyanate-terminated polyurethanes are prepared by agitating a molar excess of an arylene diisocyanate with a polyalkyleneether glycol, a polyalkyleneether-thioether glycol, a hydroxyl-terminated polyaliphatic hydrocarbon, a polyester containing a plurality of hydroxyl groups, or a tetrol made by reacting ethylenediamine sequentially with about 44 molar equivalents of 1,2-propylene oxide and about 11 molar equivalents of ethylene oxide. It is to be understood that mixtures of the foregoing polyols may be employed, if desired. In preparing the resilient, substantially open-celled polyurethane foam, these components are fed by separate streams to a mixing chamber where they are homogeneously dispersed. The relative amounts used are chosen so that enough free isocyanate groups are supplied to react with all the hydroxyl groups and to provide the carbon dioxide needed for expanding the foam.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 1000–4000. Representative examples of these glycols are poly-1,2-propyleneether glycol, ethylene oxide-modified polypropyleneether glycol, polytetramethyleneether glycol, polypentamethyleneether glycol, and polytetramethylene formal glycol. These polyalkyleneether glycols are made by the polymerization of cyclic ethers such as alkylene oxides or dioxolane or by condensation of the glycols.

Representative polyalkyleneether-thioether glycols are the following:

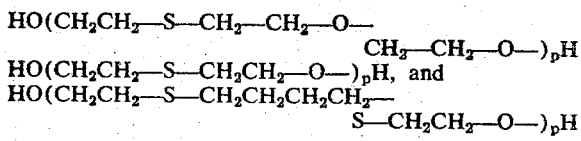

where $p$ is an integer indicating a molecular weight of 1000–4000. Their preparation is described in French Patent No. 1,128,561.

Typical polyaliphatic hydrocarbon glycols are hydroxyl-terminated polybutadiene and hydroxyl-terminated polyisoprene. Procedures for making this type of glycol are disclosed in French Patent No. 1,139,630.

The polyesters containing plurality of hydroxyl groups should have an acid number less than 2, a hydroxyl number between about 30 and 60, and a water content no greater than 0.05% (by weight). They are made by the polymerization of cyclic lactones such as ε-caprolactone or by the condensation polymerization from a dicarboxylic acid and a molar excess of an organic diol. Optionally, a small amount of a triol (e.g., trimethylolpropane) may be included to provide cross-linking. Representative examples of useful diols are ethyleneglycol, 1,2-propyleneglycol, 1,3-propanediol, 1,2-butyleneglycol, 1,4-butanediol, thiodiglycol, diethyleneglycol, triethyleneglycol and 1,2-alkylene oxide-modified glycols. Representative examples of useful triols are glycerol, trimethylolpropane, trimethylolethane and 1,2-alkylene oxide-modified glycerol. Representative examples of useful dicarboxylic acids are oxalic acid, malonic acid, succinic acid, glutaric acid, adipic acid, pimelic aid, suberic acid, azelaic acid, sebacic acid, fumaric acid, maleic acid, and phthalic acid. Anhydrides of dicarboxylic acids may be employed in place of the acids; succinic anhydride and phthalic anhydride are representative examples.

A wide variety of arylene diisocyanates may be employed in the preparation of the polyurethane foam, either alone or as isomer mixtures or as mixtures of diisocyanates. Representative compounds include toluene-2,4 - diisocyanate, 4 - methoxy-1,3-phenylenediisocyanate, 4 - chloro - 1,3 - phenylenediisocyanate, 4 - isopropyl-1,3-phenylenedissocyanate, 4-ethoxy-1,3-phenylenediisocyanate, 2,4'-diisocyanatodiphenylether, 3,3-dimethyl-4,4'-diisocyanatodiphenylmethane, mesitylene diisocyanate, durylene diisocyanate, 4,4'-methylenebis(phenylisocyanate), benzidine diisocyanate, o-nitrobenzidine diisocyanate, 4,4'-diisocyanatodibenzyl, and 1,5-naphthalenediisocyanate. The preferred diisocyanate is toluene-2,4-diisocyanate. The preferred isomer mixture contains 80% tolene-2,4-diisocyanate and 20% toluene-2,6-diisocyanate. Triisocyanates such as toluene-2,4,6-triisocyanate and 2,4,4'-triisocyanatodiphenylether may be used to provide additional crosslinking.

In general, the isocyanate-terminated polyurethanes are made by agitating the organic polyols and arylene diisocyanates in such proportions that the over-all ratio of the number of free isocyanate groups to the number of hydroxyl groups is greater than 1.0. If desired, the reaction may be carried out in several steps, one or more of which may produce an intermediate hydroxyl-terminated polyurethane prior to the final step. If desired, these intermediate hydroxyl-terminated polyurethanes may be prepared by agitating the organic polyols and aliphatic diisocyanates (e.g., 1,6-hexamethylenediisocyanate, 4,4'-methylene-bis(cyclohexyl-isocyanate), 1,4-cyclohexylenediisocyanate, 1,5-tetrahydronaphthalenediisocyanate, 1,4-butylenediisocyanate, and xylylenediisocyanate) in such proportions that the over-all ratio of the number of hydroxyl groups to the number of free isocyanate groups is greater than 1.0. These intermediate polyurethanes may then be "capped" with the arylene diisocyanate. The one-step process requires about 1 to 2 hours at 90° C. or about 1.5 to 4 hours at 80° C. or about 4 to 8 hours at 70° C. Optionally, temperatures up to about 150° C. may be employed to introduce additional crosslinking by reactions such as allophanate formation. The progress of the reaction may be followed by determining the free isocyanate content of the mixture. Finally, the polyurethanes obtained are standardized to the desired free isocyanate content (usually 8 to 13% by weight) by addition of more diisocyanate.

In preparing these polyurethane foams, the isocyanate-terminated polyurethane composition is fed to a mixing head along with any desired inert ingredients, such as surfactants, plasticizers, coloring agents, fillers, etc. The water, which is necessary for the foaming reaction, along with a catalyst to accelerate the formation of the cellular article, is fed simultaneously by a separate stream into the mixing head. If the isocyanate-terminated polyurethane is to be formed at least partly in situ, a polyol and a polyisocyanate (monomer or isocyanate-terminated polymer or both) are fed simultaneously by separate streams into the mixing head; the water and catalyst are usually contained in the polyol stream; the inert ingredients mentioned above may be present in either stream or both; optionally, the water and catalyst may be introduced by one or more streams which enter the mixing head at the same time as the polyisocyanate stream and the polyol stream. In any event, the temperatures at which the streams containing the reactants are fed to the mixing head are not critical; however, in general, temperatures of from about 25 to 50° C. should be used. The ingredients of these streams contact each other in the mixing head which deposits the composition obtained onto a flat surface or into a mold cavity where the composition subsequently expands to form a foam. A cover plate may be positioned on the mold bowl if desired after it has been loaded. The gas needed is produced by the reaction of the water with the free isocyanate groups in the composition. The presence of a catalyst tends to accelerate this reaction. Theoretically, 0.5 mole of water is needed for each mole of free isocyanate groups present in the foamable composition; generally, about 0.5 to 1.5 moles may be supplied, although about 0.6 to 1.0 mole is preferable. It is to be understood that "free" isocyanate groups means those isocyanate groups which are available to react with water. For example, when a glycol is present during the foaming reaction, its hydroxyl groups will react with isocyanate groups to form urethanes; the number of moles of alcoholic and carboxylic hydroxyl groups present in the foamable composition is subtracted from the total number of moles of isocyanate groups also present to get the number of moles of "free" isocyanate groups.

Any of the basic catalysts familiar to those skilled in the art of polyurethane foam technology may be used. N-methylmorpholine is a preferred catalyst which may be used alone or mixed with volatile trialkylamines such as triethylamine. Odorless catalysts such as 3-diethylaminopropionamide and heat-activated catalysts such as triethylamine citrate, 3-morpholinopropionamide and 2-diethylaminoacetamide are employed advantageously. The mold must be heated to about 70° C. after loading, if the heat-activated compounds are used, to complete the foaming in a convenient period of time. When the polyurethane is prepared in situ during the foaming operation, that is, when a one-shot system is employed, it is desirable to use such especially active catalysts as triethylenediamine or dibutyltin dilaurate; about 0.2 to 0.7 part of such a catalyst is introduced for each 100 parts by weight of the foamable mixture. The polyurethane foam which is obtained is resilient, has a density of not more than about 3 lbs./cu. ft. and is substantially open-celled.

This resilient, substantially open-celled polyurethane foam is then contacted with a fluid composition in order to coat substantially all of the cell walls. The fluid coating composition comprises an isocyanate-terminated polyurethane and a compound having a plurality of groups bearing active hydrogen atoms which groups are capable of reacting with isocyanate groups. The amount of active hydrogen-containing compound in the fluid composition should be sufficient to provide a ratio of active hydrogen-containing groups to isocyanate groups of from about 0.8:1 to 1.2:1. The isocyanate-terminated polyurethanes described above may be used in this fluid coating composition. The essential requirements as to the isocyanate-terminated polyurethanes is that on reaction with the active hydrogen-containing compound they yield a polyurethane elastomer.

The active hydrogen-containing compound which is used in conjunction with the isocyanate-terminated polyurethane may be a low molecular weight organic polyol or organic diamine or a mixture of these compounds. The amount of organic diamine employed should be sufficient to react with from about 50–100% of the free isocyanate groups in the isocyanate-terminated polyurethane. Arylene diamines are preferred; however, aliphatic diamines may be used under certain circumstances. It is to be understood that the term "arylene diamines" means those compounds in which each of the two amino groups is attached directly to an aromatic ring. The useful arylene diamines should exhibit a pKb at 25° C. of at least about 9.70. Diamines more basic than p-toluidine, that is, displaying pKb values less than about 9.70, react so rapidly with the isocyanate-terminated polyurethane that satisfactory mixing becomes very difficult and heterogeneous products may result. It is particularly convenient to use arylene diamines exhibiting a pKb at 25° C. of at least about 11.7. Representative examples of these preferred amines are 4,4'-methylene-bis(2-chloroaniline), 4,4'-methylene-bis(2-carbomethoxyaniline), 4,4'-diaminodiphenyldisulfide, and 4,4'-diaminodiphenylsulfone. Other useful arylene diamines are: 4,4'-methylene-bis(2-methylaniline), 4,4'-methylene-bis(2-methoxyaniline), 4,4'-methylene-bis(3-bromoaniline) and 4,4'-methylenedianiline. Mixtures of diamines may be used. Aliphatic diamines which may be used include 1,6-hexamethylenediamine, diethylenetriamine, 1,2-propanediamine, ethylenediamine, cadaverine, putrescine, piperazine, and 2,5-dimethylpiperazine.

The organic polyols may be substituted for part or all of the diamine for reaction with the isocyanate-terminated polyurethane. The amount of polyol employed should be sufficient to provide about 1 alcoholic hydroxyl group for each free isocyanate group in the isocyanate-terminated polyurethane. In other words, a stoichiometric equivalent amount should be used. These organic compounds containing a plurality of alcoholic hydroxyl groups, as in the case of the diamines, should have a molecular weight not greater than about 350. Representative glycols include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [(4-pentenyloxy)methyl]-1,3-propanediol; 3-(o-propenylphenoxy)-1,2-propanediol, thiodiglycol, 2,2'-[thiobis(ethyleneoxy)]diethanol, polyethyleneether glycol (molecular weight 200) and 2,2'-isopropylidenebis(p-phenyleneoxy)diethanol. In addition, one may use such triols as glycerol, 1,2,6-hexanetriol, 1,1,1-trimethylolpropane, 1,1,1-trimethylolethane, 3-(2-hydroxyethoxy)-1,2-propanediol, 3-(2-hydroxypropoxy)-1,2-propanediol, 2,4-dimethyl-2-(2-hydroxyethoxy)methylpentanediol-1,5, 1,1,1-tris[(2-hydroxyethoxy)methyl]ethane, 1,1,1-tris[(2-hydroxypropoxy)methyl]propane, triethanolamine, triisopropanolamine and N,N,N',N'-tetrakis(2-hydroxyethyl)ethylenediamine. Mixtures of two or more of the above polyols may be used if desired.

In preparing the fluid coating composition it is necessary merely to mix the isocyanate-terminated polyurethane with the active hydrogen-containing compound. As soon as this mixing takes place the viscosity of the fluid composition begins to increase as the isocyanate groups react with the active hydrogen-containing groups. The viscosity rises until the composition becomes immobile. When the reaction is completed, a cured solid elastomer is formed. The rate at which the composition is transformed depends upon the temperature, the nature of the active hydrogen-containing compound and the terminal isocyanate groups, and the possible presence of catalysts and/or catalytic impurities. It is desirable that the coating bath have a pot life of at least 30 minutes. This provides sufficient time for internally coating foams up to 18 inches in thickness and for recycling the excess fluid coating composition. The higher the temperature at which the impregnation is carried out, the shorter the pot life. Generally, coating bath temperatures between room temperature and 50° C. are preferred but temperatures as high as 135° C. may be used. The reactivity of active hydrogen compounds toward isocyanates is approximately: aliphatic $NH_2$>aromatic $NH_2$>hindered aromatic $NH_2$>primary aliphatic OH>secondary aliphatic OH>tertiary aliphatic OH. The reactivity of the isocyanates is approximately: unhindered aromatic NCO>hindered aromatic NCO>aliphatic NCO. A balance can be struck between the reactivity of the reactants and the coating bath temperature to insure a pot life of convenient length. In order to facilitate reaction of the isocyanate-terminated polyurethane with the active hydrogen-containing compound, catalysts such as ferric acetyl acetonate can be introduced into the composition. Ferric acetyl acetonate is preferred since it is highly effective; it is a non-hydroscopic solid, and it is readily miscible with reactants. The amount of catalyst may range from about 0.01% to 0.10% by weight, based on the combined weight of the reactants. It is advantageous to use an aliphatic tertiary amine as co-catalyst with the ferric acetyl acetonate; about 0.025 to 0.05% ferric acetyl acetonate and 0.5 to 1% of diethylaminopropionamide can be used.

The initial viscosity of the fluid composition should be low enough so that the composition can be distributed uniformly throughout the cell network of the resilient, substantially open-celled polyurethane foam. If the fluid composition is very fluid it will easily permeate the foam and be convenient to use. A more viscous composition can be used provided it cures slowly enough to allow time for proper distribution. In general, initial Brookfield viscosities (at 30° C.) below 2,000 cps. are preferred.

If the fluid composition is too viscous, it may be dissolved in an inert solvent prior to use. Such solvents should be free from active hydrogen atoms which are reactive with isocyanate groups. The concentration of solvent needed to decrease the viscosity to an acceptable level should not exceed about 40%. Excess solvent tends to swell the foam and lower its tensile strength. Representative examples of suitable solvents are such aromatic hydrogens as toluene, benzene, mixed xylenes. Viscosity depressors (such as dimethyl formamide and dimethyl sulfoxide) or plasticizers (such as dodecylphthalate, tricotyl phosphate, or dioctylphthalate) may be used when needed. Any inert material may be employed which will not degrade the resilient polyurethane foam.

In order to coat substantially all of the cell walls of the resilient polyurethane foam, it is necessary to disperse the fluid composition rather uniformly throughout the cellular structure under anhydrous conditions. Several methods of impregnation may be used. Thus, the polyurethane foam may be contacted with the fluid composition by passing the foam through a fluid composition bath wherein the composition is forced through the foam by use of differential pressures. Squeeze rollers may then be used to remove any excess composition. Another procedure which may be used is to pass the polyurethane foam through a series of saturating rolls in a fluid composition bath whereby the foam is simultaneously compressed and impregnated with the fluid. It is desirable to minimize slippage of the foam as it passes through the rollers. Improved adhesion may be obtained by applying power to both top and bottom rollers and by inserting the foam between netting or chicken wire and then passing the composite structure between the rollers. Any excess material may then be removed by the use of squeeze rolls. It is much less convenient to coat the foam when an aliphatic diamine is used to cure the isocyanate-terminated polyurethane because the pot life is very limited. In this instance, two procedures can be employed. In the first, the isocyanate-terminated polyurethane is reacted with an equivalent amount of a compound containing an active hydrogen group to form an adduct which is thermally unstable above the temperature of the coating bath; the foam is coated with the mixture of aliphatic diamine and the inert polyurethane and subsequently transferred to a heated zone where the adduct is decomposed to liberate the isocyanate groups for reaction with the diamine. In the second procedure, the foam cell walls are coated with a thin layer of the isocyanate-terminated polyurethane and the foam is subsequently transferred to a chamber where vapor of an aliphatic diamine is introduced into the foam, preferably under pressure, to cure the coating. It is apparent that any of a wide variety of procedures may be used in order to coat substantially all of the cell walls of the polyurethane foam.

Following the step of coating substantially all of the cell walls of the polyurethane foam, the foam is then heated to a temperature of from about 100–150° C. for a period of time of from about 10 minutes to several hours. This heating completes the reaction of the active hydrogen-containing compound with the isocyanate-terminated polyurethane, and the fluid composition which is coated on the cell walls is converted to a polyurethane elastomer. The resulting composite structure is, therefore, a polyurethane foam having a polyurethane elastomer adhered to substantially all of the cell walls. It is to be understood that when the coating composition has a short pot life, it is possible to cure the elastomer coating by allowing the foam to stand at ambient room temperature for a sufficiently long period of time. Heating to accelerate the cure is usually preferable.

The polyurethane composite structures of this invention have a wide variety of uses such as shoe inner soles, automobile seat cushions, abrasion resistant sponges, buffing wheels and shock absorbers. While the incorporation of the polyurethane elastomer with the resilient, substantially open-celled polyurethane foam increases the density of this foam, it has been determined that the physical properties of this foam are substantially superior to a polyurethane foam which has been initially prepared to an equivalent density.

The following examples will better illustrate the nature of the present invention; however, the invention is not intended to be limited to these examples. Parts are by weight unless otherwise indicated.

The following ASTM procedures are used:

Compression deflection, Method B _____ 575–46
Yerzley resilience _____ 945–55

The measurements of the tensile strength and extension at break are carried out with an "Accrometer" (Scott Testers Co.) set for a 100-pound load. The foam specimens are cemented to aluminum plugs which contain stems gripped by the testing machine. The samples are drawn at a head speed of 2 inches per minute.

The open cell content of the foams is measured by an apparatus which operates on the principle of Boyle's law. It makes use of the fact that when two systems contain equal volumes of air, equal pressure drops will occur in both systems if the volume of each is changed by the same amount. Conversely, if one of the systems contains a greater volume of air than the other, unequal pressure drops will occur in the systems if the volume of each is changed by the same amount.

EXAMPLE 1

A. *Preparation of polyurethane foam A*

100 parts of a polypropyleneether glycol having a molecular weight of about 2025 and a hydroxyl number of 56, 0.02 part of polydimethylsiloxane (50 cstks. grade), and 0.3 part of water are stirred together for 15 minutes at room temperature. Then 14.3 parts of a 80:20 mixture of toluene-2,4- and toluene-2,6-diisocyanate is introduced with stirring. Heat is evolved. After about 25 minutes the temperature of the mass begins to drop. External heat is then applied. The temperature is raised to 140° C. over a 50-minute period. The mass is agitated at 140° C. for 18 minutes and then cooled to 38° C. over a one-hour period. 27 additional parts of the toluene-diisocyanate isomer mixture is introduced. Polymer A thus obtained has a free isocyanate content of about 9.6% and exhibits a Brookfield viscosity of 21,000 cps. at 30° C.

100 parts of the polymer A is stirred at room temperature with 0.5 part of polydimethylsiloxane (50 centistokes grade), 5 parts of di(2-ethylhexyl)phthalate, 1 part of N-methylmorpholine, 0.3 part of triethylamine, and 2.44 parts of water (120% of theory). The foamable fluid composition thereby obtained is introduced into a mold lined with a high-melting wax. The composition contained therein expands to give a porous gel which becomes a resilient, tack-free, polyurethane foam having a density of about 2.4 lbs./cu. ft. and an open cell content above about 90%. Foam A thus obtained is stripped from the mold, passed through squeeze rollers to break the remaining closed cells and cured at 120° C. for 3 hours. Data for its physical properties are given in Table 1 below.

B. Preparation of fluid polyurethane polymer 278.7 parts of toluene-2,4-diisocyanate and 1000 parts of anhydrus polytetramethyleneether glycol (molecular weight 1000) are agitated at 80° C. for 4 hours in a dry reaction vessel protected from atmospheric moisture. Polymer B thus obtained has a free isocyanate content of 4.2%, a Brookfield viscosity of about 16,500 cps. at 30° C., and a number-average molecular weight of about 2000.

C. Preparation of curable fluid composition C 100 parts of polymer B is mixed at 100° C. with 25 parts of toluene and 13 parts of 4,4'-methylene-bis(2-chloroaniline).

D. Preparation of the composite article (foam D)

A piece of foam approximately 8" x 12" x 2", made in part A, is placed between wire screening and the laminae are immersed in 100 parts of fluid composition C at 100° C. After picking up the fluid composition it is then removed and passed through rollers to squeeze out excess fluid. The screening is stripped off. The coated foam is then cured in an oven for 2 hours at 140° C. The physical properties of the composite article (foam D) obtained are given in Table 1 below.

TABLE 1

|  | Control (Foam A) | Composite Article (Foam D) |
|---|---|---|
| Density (lb./cu. ft.) | 2.05 | 4 |
| Tensile Strength (lb./sq. in.) | 15.5 | 46 |
| Elongation at Break (Percent) | 375 | 225 |
| Compression Deflection (lb./sq. in.): |  |  |
| 25% | 0.32 | 6 |
| 50% | 0.42 | 16 |
| Yerzley Resilience (Percent) | 50 | 49 |

EXAMPLE 2

A. Preparation of polyurethane foam 2A 75 parts of polypropyleneether glycol of molecular weight about 2025, 25 parts of a tetrol (made by sequentially reacting ethylene diamine with about 44 molecules of 1,2-propylene oxide and about 11 molecules of ethylene oxide), 0.02 part of polydimethyl siloxane (50 centistokes grade), and 0.3 part of water are agitated for 20 minutes at room temperature in a dry reactor. To the mixture thus obtained is added with stirring 16 parts of a toluene diisocyanate isomer mixture (80% 2,4- and 20% 2,6-). Heat is evolved and the temperature rises. After 20 minutes external heat is applied to the mixture and its temperature is raised to 80° C. in about 40 minutes. The mixture is then agitated at 80° C. for 3 hours. Finally 27 parts of the toluene diisocyanate isomer mixture is introduced. Over a 45 minute period the mixture is cooled to 32° C. Polymer 2A thus obtained has a free isocyanate content of 9.5% and exhibits a Brookfield viscosity at 30° C. of about 5,000–6,000 cps.

To 100 parts of polymer 2A prepared above is added with stirring at room temperature 0.5 part of polydimethyl siloxane (50 centistokes grade), 13.3 parts of N,N,N',N'-tetrakis(2-hydroxy-ethyl)ethylenediamine, 0.4 part of water, 1.5 parts of N-methyl morpholine, and 0.5 part of triethylamine. The mixture obtained is introduced into a mold lined with a high melting wax. There it expands to give a foam which subsequently becomes tack-free. The foam is stripped from the mold and heated for 3 hours at 120° C. to give a cured product. Its properties are given below in Table 2.

B. Preparation of coated foam 2B

A piece of foam, approximately 8" x 12" x 2", made in part A of Example 1, is placed between wire screening and immersed in 400 parts of fluid composition C of Example 1 at 100° C. After picking up the composition, the laminae are then removed and passed through rollers to squeeze out excess fluid. The screens are removed and the coated foam is then cured in an oven at 140° C. for 2 hours. The physical properties of the composite article obtained are given in Table 2 below.

TABLE 2

|  | Control (Foam 2A) | Composite Article (Foam 2B) |
|---|---|---|
| Density (lb./cu. ft.) | 11.5 | 9 |
| Tensile Strength (lb./sq. in.) | 50 | 81 |
| Elongation at Break (Percent) | 47 | 250 |
| Compression Deflection (lb./sq. in.): |  |  |
| 25% | 15 | 12 |
| 50% | 27 | 28 |
| Yerzley Resilience (Percent) | 23 | 55 |

As many widely different embodiments of this invention may be made without departing from the spirit and scope thereof, it is to be understood that this invention is not limited to the specific embodiments thereof except as defined in the appended claims.

I claim:

1. A resilient cellular polyurethane composite structure comprising a resilient polyurethane foam having a cured polyurethane elastomer coating composition on substantially all of the cell walls thereof, said coating composition being obtained from an isocyanate-terminated polyurethane polymer and a compound having a plurality of groups which are capable of reacting with isocyanate groups, said compound being selected from the group consisting of organic polyols, organic diamines and mixtures thereof; said resilient polyurethane foam being substantially open-celled and having a density not greater than about 3 pounds per cubic foot prior to being coated with said coating composition.

2. A composite structure according to claim 1 wherein the polyurethane foam having a cured coating composition on substantially all of the cell walls thereof is prepared from a polyalkyleneether glycol having a molecular weight of from about 1000 to 4000, an arylene diisocyanate and water.

3. A composite structure according to claim 2 wherein the polyalkyleneether glycol is a polypropyleneether glycol and the arylene diisocyanate is an isomeric mixture of toluene-2,4-diisocyanate and toluene-2,6-diisocyanate.

4. A composite structure according to claim 3 wherein the cured coating composition on substantially all of the cell walls of the polyurethane foam is obtained from an arylene diamine and an isocyanate-terminated polyurethane polymer prepared from a polyalkyleneether glycol and an arylene diisocyanate.

5. A composition structure according to claim 4 wherein the arylene diamine is 4,4'-methylene-bis(2-chloroaniline), the polyalkyleneether glycol is a polytetramethyleneether glycol and the arylene diisocyanate is toluene-2,4-diisocyanate.

References Cited in the file of this patent

UNITED STATES PATENTS

| 2,721,811 | Dacey et al. | Oct. 25, 1955 |
| 2,900,278 | Powers | Aug. 18, 1959 |